United States Patent
Dachiku (10) Patent No.: US 9,374,498 B2
(45) Date of Patent: Jun. 21, 2016

(54) IMAGE PROCESSING APPARATUS, PROCESSING UNIT, AND IP ADDRESS MANAGING METHOD

(75) Inventor: Kenshi Dachiku, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 728 days.

(21) Appl. No.: 12/723,014

(22) Filed: Mar. 12, 2010

(65) Prior Publication Data

US 2010/0325390 A1    Dec. 23, 2010

(30) Foreign Application Priority Data

Jun. 18, 2009 (JP) ................................. 2009-145475

(51) Int. Cl.

| | |
|---|---|
| *G06F 15/173* | (2006.01) |
| *H04N 1/32* | (2006.01) |
| *H04L 29/12* | (2006.01) |
| *H04N 1/00* | (2006.01) |

(52) U.S. Cl.
CPC ...... *H04N 1/32502* (2013.01); *H04L 29/12254* (2013.01); *H04L 61/2038* (2013.01); *H04L 61/609* (2013.01); *H04N 1/0083* (2013.01); *H04N 1/32358* (2013.01); *H04N 2201/0082* (2013.01); *H04N 2201/0084* (2013.01)

(58) Field of Classification Search
CPC .................... H04L 41/0809; H04L 61/2007
USPC .......................................... 709/226
See application file for complete search history.

(56) References Cited

U.S. PATENT DOCUMENTS

| | | | | |
|---|---|---|---|---|
| 7,738,242 | B2 * | 6/2010 | McGraw et al. | 361/679.21 |
| 8,856,196 | B2 * | 10/2014 | Yamada | G06F 9/505 |
| | | | | 708/104 |
| 2003/0105904 | A1 * | 6/2003 | Abbondanzio et al. | 710/302 |
| 2005/0125575 | A1 * | 6/2005 | Alappat et al. | 710/41 |
| 2005/0256942 | A1 * | 11/2005 | McCardle et al. | 709/220 |
| 2005/0262218 | A1 * | 11/2005 | Cox et al. | 709/217 |
| 2006/0062160 | A1 * | 3/2006 | Kim et al. | 370/257 |

(Continued)

FOREIGN PATENT DOCUMENTS

| | | |
|---|---|---|
| JP | 2003-534572 | 11/2003 |
| JP | 2005-18474 | 1/2005 |
| JP | 2008-276686 | 11/2008 |

OTHER PUBLICATIONS

Notice of Reasons for Rejection issued by the Japanese Patent Office on Apr. 12, 2011, for Japanese Patent Application No. 2009-145475, and English-language translation thereof.

*Primary Examiner* — Ario Etienne
*Assistant Examiner* — Blake Rubin
(74) *Attorney, Agent, or Firm* — Finnegan, Henderson, Farabow, Garrett & Dunner, LLP (57) ABSTRACT

An image processing apparatus includes connectors to each of which position information is allocated, processing units configured to be connected to the connectors, each of the processing units is configured to read position information, and to output an IP address of the processing unit determined based on the position information and identification information which denotes a function of the processing unit via the connector, and a control unit configured to be connected with the connectors in compliance with a standard for a transmission line in an IP (internet protocol) network, and to manage the IP address and the identification information of the processing unit.

13 Claims, 4 Drawing Sheets

(56) References Cited

U.S. PATENT DOCUMENTS

2006/0227367 A1* 10/2006 Kitada ................ G06F 11/2028
                                                              358/1.15
2007/0271276 A1* 11/2007 Allen et al. ..................... 707/10
2009/0240925 A1* 9/2009 Ishihara .................. H04L 69/12
                                                              712/221
2010/0008374 A1* 1/2010 Shigeta et al. ................. 370/401
2012/0042052 A1* 2/2012 Ma ........................... G06T 1/00
                                                              709/219

* cited by examiner

| IP address | Processing unit |
|---|---|
| (192.168.1.3) | Input unit 40-1 |
| (192.168.1.5) | Memory unit 40-3 |
| (192.168.2.1) | Output unit 40-5 |
| ⋮ | ⋮ |

IMAGE PROCESSING APPARATUS, PROCESSING UNIT, AND IP ADDRESS MANAGING METHOD

CROSS-REFERENCE TO RELATED APPLICATIONS

This application is based upon and claims the benefit of priority from prior Japanese Patent Application No. 2009-145475, filed Jun. 18, 2009, the entire contents of which are incorporated herein by reference.

BACKGROUND OF THE INVENTION

1. Field of the Invention

The present invention relates to an image processing apparatus which stores an image captured, a processing unit which is utilized in the image processing apparatus, and an IP address managing method.

2. Description of the Related Art

Conventionally, an image processing apparatus which stores captured image data includes a plurality of input units, a plurality of memory units, a plurality of output units and a controller which controls the units. The image processing apparatus encodes captured image data using the input units and stores the image data in the memory units. The image processing apparatus reads the image data from the memory units and decodes the image data using the output units to output the image data. The units in the image processing apparatus are connected to each other via a control bus and a data bus. The controller controls the input units, the memory units, and the output units (see, Jpn. PCT National Publication NO. 2003-534572, for example). The units send and receive the image data using the data bus.

However, such conventional image processing apparatus, which transmits a control signal and the image data through a bus, has a limit to performance in bus connection. Thus, speeding data transmission up and transmitting the data with multi-channels are difficult to accomplish.

BRIEF SUMMARY OF THE INVENTION

According to an embodiment of the present invention, an image processing apparatus comprises:

connectors to each of which position information is allocated;

processing units configured to be connected to the connectors, each of the processing units is configured to read position information, and to output an IP address of the processing unit determined based on the position information and identification information which denotes a function of the processing unit via the connector; and a control unit configured to be connected with the connectors in compliance with a standard for a transmission line in an IP (internet protocol) network, and to manage the IP address and the identification information of the processing unit.

According to another embodiment of the present invention, a processing unit to be used in an image processing apparatus comprising connectors to each of which position information is allocated, and a control unit configured to be connected with the connectors in compliance with a standard for a transmission line in an IP (internet protocol) network, and to manage an IP address and identification information of the processing unit, the processing unit being connected with one of the connectors, the processing unit comprises:

a reading unit configured to read position information from the one of the connectors;

a determining unit configured to determine the IP address of the processing unit based on the position information read by the reading unit;

a process execution unit configured to execute predetermined processing on image data denoted by the identification information; and an transmission unit configured to transmit the IP address and the identification information of the processing unit to the control unit.

According to another embodiment of the present invention, an IP address managing method used in an image processing apparatus which comprises connectors to each of which position information is allocated, processing units configured to be connected to the connectors, and a control unit configured to be connected with the connectors in compliance with a standard for a transmission line in an IP (internet protocol) network, the method comprises:

reading position information by each of the processing units;

outputting, from each of the processing units, an IP address of the processing unit determined based on the position information and identification information which denotes a function of the processing unit via the connector; and managing the IP address and the identification information of the processing unit by the control unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

Embodiments of an image processing apparatus according to the invention will now be described in detail with reference to the accompanying drawings.

First Embodiment

Figure 1:
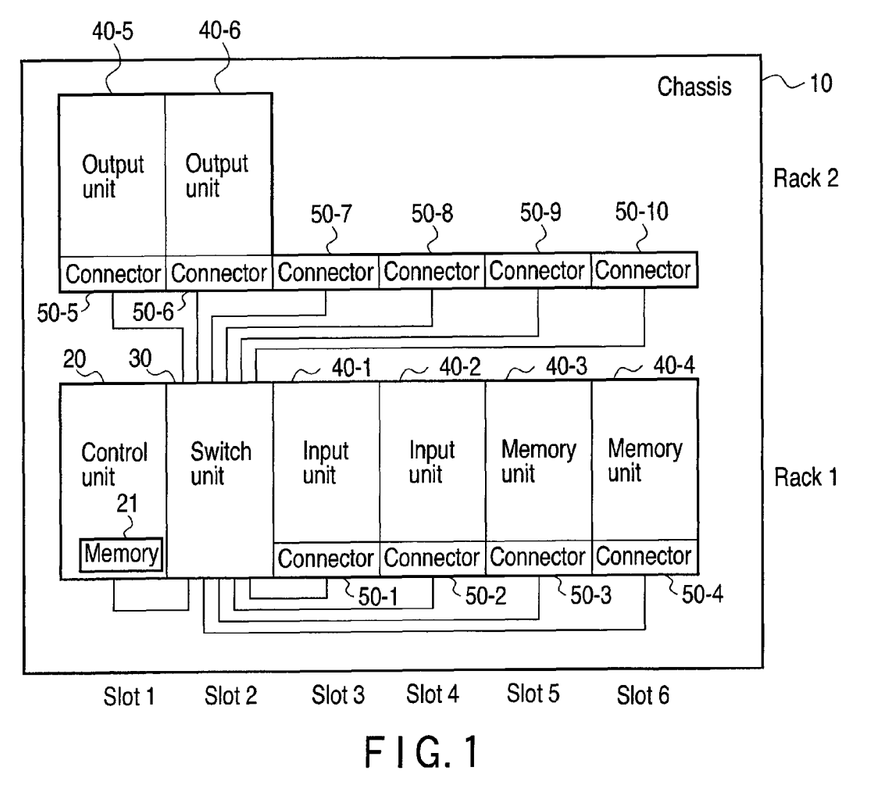
FIG. 1 schematically shows a configuration of an image processing apparatus according to a first embodiment of the present invention.

FIG. 1 schematically shows a configuration of an image processing apparatus according to the first embodiment of the present invention. The image processing apparatus shown in FIG. 1 includes a chassis 10 having two racks each of which includes six slots. The chassis 10 houses a control unit 20, a switch unit 30, input units 40-1 and 40-2, memory units 40-3 and 40-4, and output units 40-5 and 40-6. The input units 40-1 and 40-2, the memory units 40-3 and 40-4, and the output units 40-5 and 40-6 function as processing units. The control unit 20 is connected to the switch unit 30 and the switch unit 30 is connected to the processing units 40-1 to 40-6. The connection between the units employs the IP protocol that is the standards of transmission lines for LAN (local area network), such as Ethernet (registered trademark). In the present embodiment, a control command output from the control unit 20 and image data transmitted between the processing units 40-1 to 40-6 are transferred through one cable.

The control unit 20 and the switch unit 30 are positioned at predetermined positions in the chassis 10. In FIG. 1, the control unit 20 is positioned at a slot 1 in a rack 1, and the switch unit 30 is positioned at a slot 2 in the rack 1. The positions of the control unit 20 and the switch unit 30 in the chassis 10 will not be changed.

Each of the processing unit 40-1 to 40-6 is inserted into a slot in the chassis 10 and connected to corresponding one of connectors 50-1 to 50-10. The connectors 50-1 to 50-10 are provided for the respective slots. The processing units 40-1 to 40-6 can be inserted into and detached from any of the slots. In FIG. 1, the input unit 40-1 is positioned at a slot 3 in the rack 1, and the input unit 40-2 is positioned at a slot 4 in the rack 1. The memory unit 40-3 is positioned at a slot 5 in the rack 1 and the memory unit 40-4 is positioned at a slot 6 in the rack 1. The output unit 40-5 is positioned at a slot 1 in a rack 2 and the output unit 40-6 is positioned at a slot 2 in the rack 2.

Next, functions of the above configuration will be described.

A rack number and a slot number are set for each of the connectors 50-1 to 50-10 in accordance with the position in the racks and the slots where the connector is arranged. When any of the processing unit 40-1 to 40-6 is connected to one of the slots, the corresponding rack number and the corresponding slot number are read out.

Figure 2:
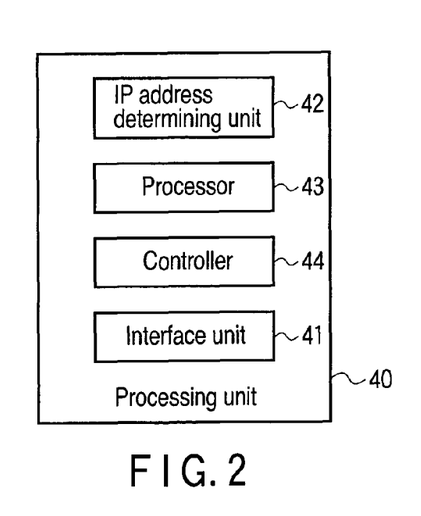
FIG. 2 is a block diagram showing a functional configuration of a processing unit shown in FIG. 1.

FIG. 2 shows a functional configuration of the processing units 40-1 to 40-6 according to an embodiment. Each of the processing units 40-1 to 40-6 includes an interface (I/F) unit 41, an IP address determining unit 42, a processor 43, and a controller 44. When one of the processing units 40-1 to 40-6 is inserted into one slot, the interface unit 41 is engaged with a connector of the slot.

The interface unit 41, which is engaged with the connector, sends a signal to and receives a signal from the switch unit 30. The interface unit 41 reads out the rack number and the slot number of the engaging connector.

The IP address determining unit 42 determines an IP address of the processing unit based on the read rack number and slot number. The IP address determining unit 42 outputs the determined IP address to the controller 44.

The processor 43 executes processing which is specific to the processing unit under a control command from the control unit 20. For example, the processor 43 of the input unit 40-1 and 40-2 has a function of encoding input image data. The processor 43 of the memory unit 40-3 and 40-4 has a function of storing the input image data. In addition, the processor 43 of the output units 40-5 and 40-6 has a function of decoding the image data.

The controller 44 includes a CPU (central processing unit) including a microprocessor. The controller 44 controls operations of the processing unit 40-1 to 40-6. The controller 44 receives the IP address from the IP address determining unit 42, and outputs the IP address and identification information which identifies the function of the processing unit (input, memory, or output) from the interface unit 41. The controller 44 affixes the IP address of the control unit 20 as a destination, to the IP address determined by the IP address determining unit 42 and the identification information.

The controller 44 transmits image data processed by the processor 43 from the interface unit 41 under a control command from the control unit 20. The controller 44 affixes an IP address of a destination processing unit to the image data.

The switch unit 30 reads out an IP address of the destination from a received signal, and switches logically the connection between the units for the signal to reach the destination processing unit. When one of the processing units 40-1 to 40-6 sends an IP address and identification information, the switch unit 30 sends the IP address and identification information to the control unit 20.

The control unit 20 receives the IP address and the identification information from one of the processing unit 40-1 to 40-6 and updates a management table preliminarily stored in a memory 21. Thus, the control unit 20 acquires the IP address and the function of a processing unit which is connected to one of the connectors 50-1 to 50-6. When execution of processing is requested from outside, the control unit 20 transmits a control command to a processing unit, which is corresponding to the requested processing. The control unit 20 refers to the management table stored in the memory 21 to select a processing unit corresponding to the requested processing, and sends, to the selected processing unit, execution start command with the IP address of the selected processing unit.

Then, operations of the image processing apparatus configured as above will be described.

Figure 3:
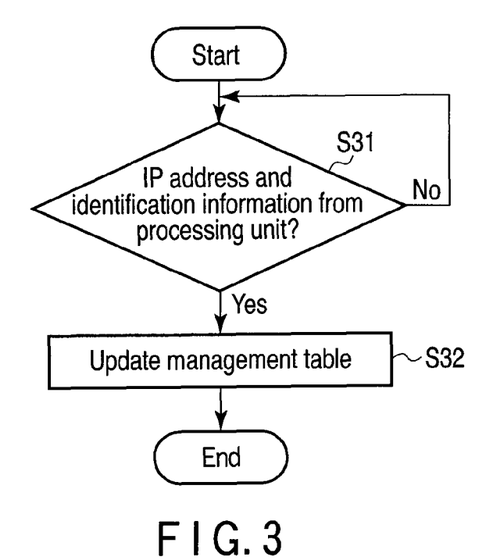
FIG. 3 is a flowchart showing operations executed by a control unit at the time of setting IP addresses for the processing unit shown in FIG. 1.

Firstly, IP address setting for the processing units 40-1 to 40-6 which are connected to the chassis 10 will be described. FIG. 3 shows a flowchart of the IP address setting. Hereinafter, a case in which the input unit 40-1 is inserted into the slot 3 in the rack 1 will be explained by way of example.

When the input unit 40-1 is inserted into the slot 3 in the rack 1 and the interface unit 41 of the input unit 40-1 is engaged with the connector 50-1, the interface unit 41 reads out a combination of the rack number and the slot number, i.e., (1, 3), from the connector 50-1. The IP address determining unit 42 determines the IP address of the input unit 40-1, that is, (192. 168. 1. 3), based on the read rack number and slot number. The determined IP address is output to the controller 44. The controller 44 receives determined IP address (192. 168. 1. 3) and the identification information which indicates that the processing unit 40-1 functions as the input unit from the interface unit 41. The interface unit 41 also outputs the IP address of the control unit 20 as the destination IP address. In accordance with the IP address, the switch unit 30 transmits the IP address and the identification information sent from the input unit 40-1 to the control unit 20.

It is determined in the control unit 20 whether or not an IP address and identification information from any one of the processing units 40-1 to 40-6 is received by the control unit 20 (step S31). When the control unit 20 receives the IP address and identifying information from the input unit 40-1 ("Yes" in step 31), the control unit 20 detects that the IP address (192. 168. 1. 3) is allocated to the input unit and updates the management table in the memory 21 (step S32).

Thus, when one or more of the processing units 40-1 to 40-6 are connected to the connectors 50-1 to 50-6, IP addresses of the connected processing units are automatically set. Conventionally, DHCP (dynamic host configuration protocol) can be used to allocate an IP address to newly connected equipment. However, such IP address allocation using DHCP requires searching for an empty address every time new equipment is connected, which increases processing loads. Moreover, every time the new equipment is started up, the IP address is changed and managing the IP addresses may be difficult. In comparison, in the image processing apparatus according to the present embodiment, an IP address which is preliminarily set to a slot is allocated to a processing unit which is connected to the slot. Therefore, the control unit 20 need not search for an empty address, and the IP address will not be changed even though the unit is started up. Thus, the allocation of the IP addresses according to the present embodiment does not increase the processing loads. That is, the image processing apparatus according to the present embodiment can decrease the processing loads for allocation of the IP addresses.

Figure 4:
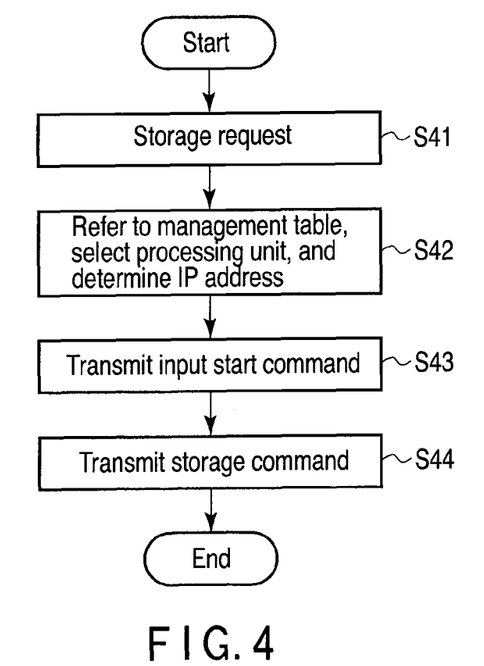
FIG. 4 is a flowchart showing operations executed by the control unit at the time when the control unit is requested to store image data.
Figure 5:
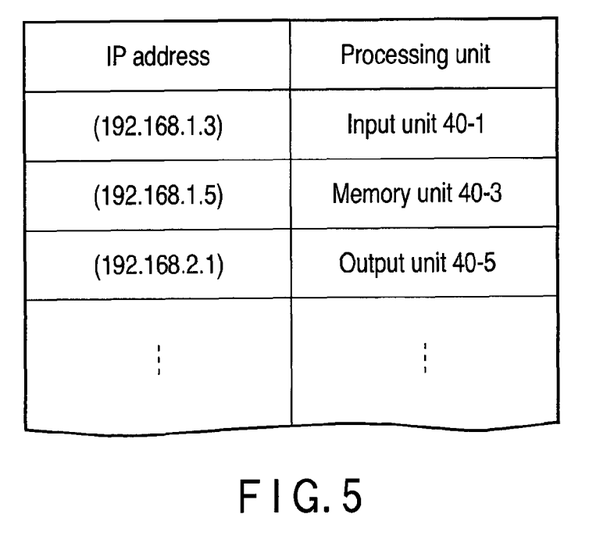
FIG. 5 is a view showing an example of a management table stored in a memory shown in FIG. 1.

Then, execution of processing in response to a request from outside will be described. FIG. 4 shows a flowchart showing operations of the control unit 20 for the case where the control unit 20 is requested to store image data. FIG. 5 shows an example of a management table stored in the memory 21 of the control unit 20.

The control unit 20 is requested to execute storage processing from outside (step S41). The control unit 20 refers to the management table, selects the input unit 40-1 and the memory unit 40-3, and determines (192. 168. 1. 3) and (192. 168. 1. 5) as the IP addresses of the selected units (step S42). Then, the control unit 20 sends input start command (step S43). To the input start command, affixed are an IP address (192. 168. 1. 3) which denotes the destination of the input start command, and an IP address (192. 168. 1. 5) of the unit to which the image data is transmitted. The switch unit 30 switches the connection in accordance with the IP address (192. 168. 1. 3), and transmits the input start command to the input unit 40-1. When the input unit 40-1 receives the input start command, the input unit 40-1 acquires image data from outside and encodes the image data. The input unit 40-1 affixes the IP address (192. 168. 1. 5) of the memory unit 40-3 to the image data and sends the image data to the memory unit 40-3. The switch unit 30 switches the connection in accordance with the IP address (192. 168. 1. 5) and allows transmission of the encoded image data to the memory unit 40-3.

Then, the control unit 20 sends a storage command to which the IP address of (192. 168. 1. 5) is affixed (step S44). The switch unit 30 switches the connection in accordance with the IP address (192. 168. 1. 5) and transmits the storage command to the memory unit 40-3 (step S45). When the memory unit 40-3 receives the storage command, the memory unit 40-3 stores the image data transmitted from the input unit 40-1.

Figure 6:
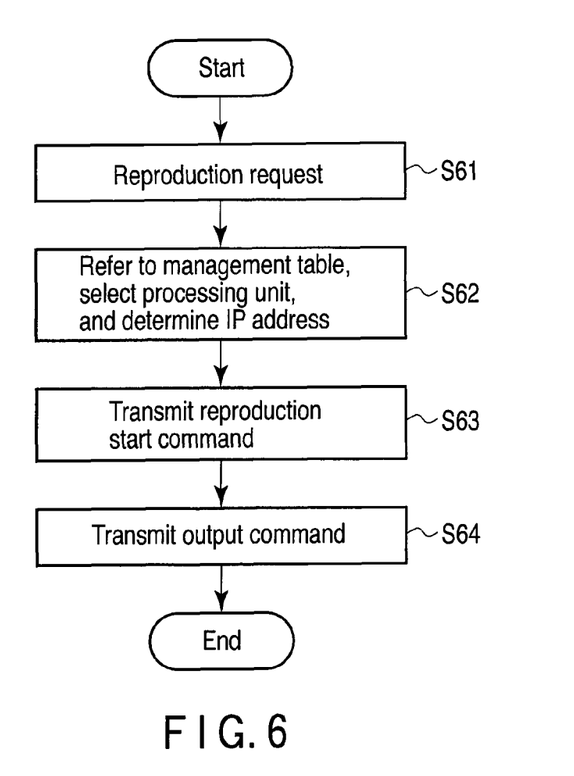
FIG. 6 is a flowchart showing operations executed by the control unit at the time when the control unit is requested to reproduce image data.

FIG. 6 shows a flowchart of operations of the control unit 20 executed when reproduction of the image data is requested.

The control unit 20 is requested to reproduce the image data from outside (step S61). The control unit 20 refers to the management table, selects the memory unit 40-3 and the output unit 40-5, and determines IP addresses (192. 168. 1. 5) and (192. 168. 2. 1) as the IP addresses of the memory unit 40-3 and the output unit 40-5 (step S62). Then, the control unit 20 sends a reproduction start command (step S63). To the reproduction start command, affixed are the IP address (192. 168. 1. 5) of the destination of the reproduction start command and the IP address (192. 168. 1. 5) of the unit to which the image data will be transmitted. The switch unit 30 switches the connection in accordance with the IP address (192. 168. 1. 5), and transmits the reproduction start command to the memory unit 40-3. When the memory unit 40-3 receives the reproduction start command, the memory unit 40-3 reads out stored image data. Then, the memory unit 40-3 affixes IP address (192. 168. 2. 1) of the output unit 40-5 to the image data, and transmits the image data to the output unit 40-5. The switch unit 30 switches the connection in accordance with the IP address (192. 168. 2. 1) and transmits the image data to the output unit 40-5.

The control unit 20 sends an output command to which the IP address (192. 168. 2. 1) of the output unit 40-5 (step S64). The switch unit 30 switches the connection in accordance with the IP address (192. 168. 2. 1) and transmits the output command to the output unit 40-5. In response to the output command, the output unit 40-5 encodes the image data transferred from the memory unit 40-3 and outputs the image data to the outside.

As described above, the image processing apparatus according to the present embodiment includes the switch unit 30, and utilizes the Ethernet or the like, which is an example of IP network. Therefore, the control command and the image data can be transmitted between the processing units 40-1 to 40-6.

Thus, the image processing apparatus according to the present embodiment allows speeding up data transmission and allows processing with multi-channels.

Second Embodiment

Figure 7:
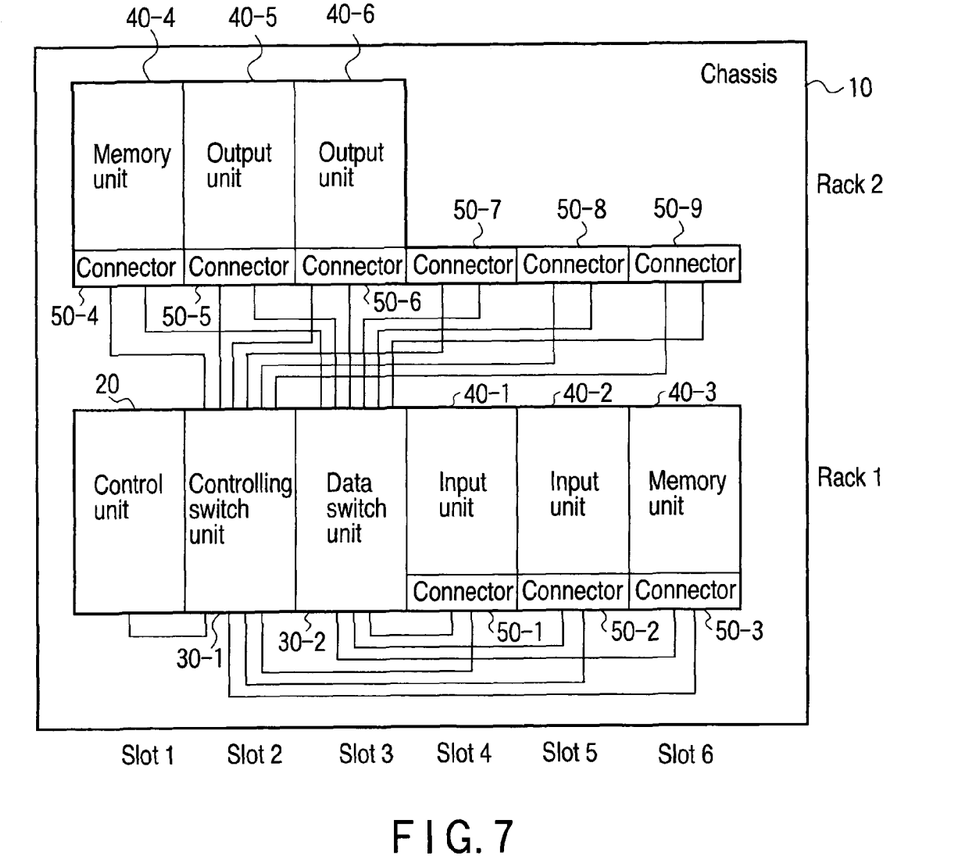
FIG. 7 schematically shows a configuration of an image processing apparatus according to a second embodiment of the present invention.

FIG. 7 schematically shows a configuration of an image processing apparatus according to the second embodiment of the present invention. The same portions as those of the first embodiment will be indicated in the same reference numerals and their detailed description will be omitted.

The image processing apparatus shown in FIG. 7 includes a chassis 10 having two racks each of which includes six slots. The chassis 10 houses a control unit 20, a controlling switch unit 30-1, a data switch unit 30-2, input units 40-1 and 40-2, memory units 40-3 and 40-4, and output units 40-5 and 40-6. The input units 40-1 and 40-2, the memory units 40-3 and 40-4, and the output units 40-5 and 40-6 function as processing units. The control unit 20 is connected to the controlling switch unit 30-1 and the controlling switch unit 30-1 is connected to the processing units 40-1 to 40-6. The data switch unit 30-2 is connected with the processing units 40-1 to 40-6. The connection between the units employs the IP protocol that is the standards of transmission lines for LAN (local area network), such as Ethernet (registered trademark). In the present embodiment, a control command and image data are respectively transferred through different cables.

The controlling switch unit 30-1 and the data switch unit 30-2 are positioned at predetermined positions in the chassis 10. In FIG. 7, the controlling switch unit 30-1 is positioned at a slot 2 in a rack 1, and the data switch unit 30-2 is positioned at a slot 3 in the rack 1. The positions of the controlling switch unit 30-1 and the data switch unit 30-2 will not be changed.

The controlling switch unit 30-1 receives a control command from the control unit 20, and reads an IP address of the destination which is affixed to the received control command. The controlling switch unit 30-1 switches the connection between the units for the control command to reach the destination unit. When one of the processing units 40-1 to 40-6 outputs an IP address of the unit and identification information, the controlling switch unit 30-1 transmits the output IP address and the identification information to the control unit 20.

The data switch unit 30-2 receives image data from the processing units 40-1 to 40-6 and reads an IP address of the destination of the image data, which is affixed to the image data. The data switch unit 30-2 switches the connection between the units for the image data to reach the destination processing unit.

Then, operations of the image processing apparatus configured as above will be described.

Firstly, IP address setting for the processing units 40-1 to 40-6 which are housed in the chassis 10 will be described. Hereinafter, a case in which the input unit 40-1 is inserted into the slot 4 in the rack 1 will be explained by way of example.

When the input unit 40-1 is inserted into the slot 4 in the rack 1 and the interface unit 41 of the input unit 40-1 is engaged with the connector 50-1, the interface unit 41 reads out a combination of the rack number and the slot number, i.e., (1, 4), from the connector 50-1. The IP address determining unit 42 determines IP address (192. 168. 1. 4) as the IP address for a controlling system, and IP address (192. 168. 1. 104) as the IP address for a data transmission system. The determined IP addresses are output to the controller 44. The controller 44 transmits, from the interface unit 41, the determined IP addresses (192. 168. 1. 4) for the controlling system and (192. 168. 1. 104) for the data transmission system and identification information, which denotes that the processing unit 40-1 functions as the input unit. The interface unit 41 also outputs the IP address of the control unit 20 as the destination IP address. In accordance with the IP address, the controlling switch unit 30-1 transmits the IP addresses and the identification information sent from the input unit 40-1 to the control unit 20.

It is determined in the control unit 20 whether or not an IP address and identification information from any of the processing units 40-1 to 40-6 is received by the control unit 20. When the control unit 20 receives the IP address and identifying information from the input unit 40-1, the control unit 20 detects that the IP address for the controlling system (192. 168. 1. 4) and the IP address (192. 168. 1. 104) for the data transmission system are allocated to the input unit 40-1 and updates the management table in the memory 21.

In the image processing apparatus according to the present embodiment, IP addresses which are preliminarily set to a slot are allocated to a processing unit which is connected to the slot. Therefore, the control unit 20 need not search for an empty address, and the IP addresses will not be changed even though the unit is started up. Thus, the allocation of the IP addresses according to the present embodiment does not increase the processing loads. That is, the image processing apparatus according to the present embodiment can decrease the processing loads for allocation of the IP addresses.

Then, execution of processing in response to a request from outside will be described. Firstly, a case where the control unit 20 is requested to store image data will be described.

When the control unit 20 is requested to execute storage processing from outside, the control unit 20 resets to the management table, selects the input unit 40-1 and the memory unit 40-3, and determines IP addresses (192. 168. 1. 4) and (192. 168. 1. 6) as the IP addresses for the controlling system and IP addresses (192. 168. 1. 104) and (192. 168. 1. 106) as the IP addresses for the data transmission system. The control unit 20 sends input start command. To the input start command, affixed are an IP address (192. 168. 1. 4) which denotes the destination of the input start command for the controlling system, and an IP address (192. 168. 1. 106) of the unit to which the image data is transmitted, for the data transmission system. The controlling switch unit 30-1 switches the connection in accordance with the IP address for the controlling system, i.e., (192. 168. 1. 4), and transmits the input start command to the input unit 40-1. When the input unit 40-1 receives the input start command, the input unit 40-1 acquires image data from outside and encodes the image data. The input unit 40-1 affixes the IP address for the data transmission system of the memory unit 40-3, i.e., (192. 168. 1. 106), to the encoded image data and sends the image data to the memory unit 40-3. The data switch unit 30-2 switches the connection in accordance with the IP address for the data transmission system of the memory unit 40-3, i.e., (192. 168. 1. 106), and allows transmission of the encoded image data to the memory unit 40-3.

Then, the control unit 20 sends a storage command to which the IP address (192. 168. 1. 6) that is the IP address for the controlling system of the memory unit 40-3 is affixed. The controlling switch unit 30-1 switches the connection in accordance with the IP address (192. 168. 1. 6) for the controlling system and transmits the storage command to the memory unit 40-3. When the memory unit 40-3 receives the storage command, the memory unit 40-3 stores the image data transmitted from the input unit 40-1.

Next, a case where the control unit 20 is requested to reproduce image data will be described.

When it is requested from outside to reproduce the image data, the control unit 20 refers to the management table, selects the memory unit 40-3 and the output unit 40-5, and determines the IP addresses for the controlling system, that is, (192. 168. 1. 6) of the memory unit 40-3 and (192. 168. 2. 2) of the output unit 40-5, and the IP addresses for the data transmission system, that is, (192. 168. 1. 106) of the memory unit 40-3 and (192. 168. 1. 102) of the output unit 40-5. The control unit 20 sends a reproduction start command. To the reproduction start command, affixed are the IP address (192. 168. 1. 6) of the destination of the reproduction start command for the controlling system and the IP address (192. 168. 2. 102) for the data transmission system which denotes the unit to receive the image data. The controlling switch unit 30-1 switches the connection in accordance with the IP address (192. 168. 1. 6) for controlling system, and transmits the reproduction start command to the memory unit 40-3. In response to the reproduction start command, the memory unit 40-3 reads out stored image data. Then, the memory unit 40-3 affixes the IP address (192. 168. 2. 102) of the output unit 40-5 for the data transmission system to the read image data and transmits the image data to the output unit 40-5. The data switch unit 30-2 switches the connection in accordance with the IP address (192. 168. 2. 102) for data transmission system, and transmits the image data to the output unit 40-5.

The control unit 20 sends an output command to which the IP address (192. 168. 2. 2) of the output unit 40-5 for the controlling system is affixed. The controlling switch unit 30-1 switches the connection in accordance with the IP address (192. 168. 2. 2) for the controlling system and transmits the output command to the output unit 40-5. In response to the output command, the output unit 40-5 encodes the image data transferred from the memory unit 40-3 and outputs the image data to the outside.

As described above, the image processing apparatus according to the present embodiment includes the controlling switch unit 30-1 and the data switch unit 30-2, and each of the units has IP addresses. Therefore, the destination of the control command can be changed by switching the control switch unit 30-1 in accordance with an IP address affixed to the control command. In addition, the destination of the image data can be changed by switching the data switch unit 30-2 in accordance with an IP address affixed to the image data.

Data transmission over the IP network is performed on "best effort" basis. Accordingly, in the case where a control command and image data are transmitted over the same cable, when the cable is occupied with the image data, transmission of the control command may be delayed. However, the image processing apparatus according to the present embodiment includes the controlling switch unit 30-1 and the data switch unit 30-2. Thus, a controlling network and a data network can be separated and the delay in the control command can be prevented.

Therefore, the image processing apparatus according to the present embodiment allows speeding up data transmission and allows processing with multi-channels.

Other Embodiments

The embodiments of the present invention will not be limited to the embodiments described above. For example, in the above embodiments, the chassis 10 includes two racks each of which includes six slots; however, the numbers of the racks and the slots are not so limited.

In the above embodiments, when any of the processing units 40-1 to 40-6 is connected to any of the connectors 50-1 to 50-6, an IP address corresponding to the slot is allocated to the processing unit. However, the IP address is not necessarily allocated at the time of the engagement of the processing unit and the connector. For example, when a processing unit which has been connected to a connecter is started up, an IP address may be allocated to the processing unit.

In the above embodiments, a slot number corresponding to positions of the rack and the slot is read out from the connector. When more than one chassis house the processing units, indexing numbers may be allocated to the chassis. In such a case, higher four bits in an IP address may indicate a chassis number and lower four bits in the IP address may indicate a slot number.

In the above embodiments, the processing units include the input units 40-1 and 40-2, the memory units 40-3 and 40-4, and the output units 40-5 and 40-6. However, the types of the processing units are not so limited. The processing units may include an image process unit which executes specific image processing on image data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
    connectors to each of which position information is allocated;
    image processing units configured to be connected to the connectors, each of the image processing units configured to read position information from the connected connector, and to output an IP address and identification information of the image processing unit, wherein the IP address is determined based on the position information and the identification information denotes a function of the image processing unit via the connected connector;
    a control unit configured to be connected with the connectors in compliance with a standard for a transmission line in an IP (internet protocol) network, wherein the control unit is configured to:
        receive the IP addresses and the identification information of the image processing units via the connectors;
        manage the IP addresses and the identification information of the image processing units;
        receive an instruction signal for processing image data;
        select, in response to the received instruction signal, a first one of the image processing units, wherein the first image processing unit is selected based on the identification information of the first image processing unit;
        select a second one of the image processing units, wherein the second image processing unit is based on the identification information of the second image processing unit;
        generate a control signal for processing image data at the first image processing unit, wherein the control signal corresponds to the instruction signal for processing image data;
        determine a first IP address which denotes the destination of the control signal, the first IP address based on the IP address of the first image processing unit;
        determine a second IP address which denotes the destination of the image data transmitted from the first image processing unit after processing, the second IP address based on the IP address of the second image processing unit; and
        transmit the control signal with the first and second IP addresses;
    a first switch unit configured to switch the connection between the control unit and the connectors in accordance with the first IP address so the control signal reaches the first image processing unit specified by the first IP address;
    a second switch unit configured to switch the connection between the connectors in accordance with the second IP address so the image data transmitted from the first image processing unit reaches the second image processing unit specified by the second IP address; and
    a chassis housing the connectors, the image processing units, the control unit, the first switch unit, and the second switch unit.

2. The image processing apparatus according to claim 1, wherein:
    the control signal at the first image processing unit is a first control signal;
    the control unit:
        generates a second control signal for processing image data at the second image processing unit in response to the instruction signal;
        selects the first image processing unit, wherein the first image processing unit is configured to execute first processing in accordance with the first control signal;
        selects the second image processing unit, wherein the second image processing unit is configured to execute a second processing;

transmits the first control signal with the first IP address determined based on the IP address of the first image processing unit and the second IP address; and transmits the second control signal with the second IP address determined based on the IP address of the second image processing unit;

the first switch unit switches connection between the control unit and the connectors in accordance with the second IP address affixed to the second control signal so that the second control signal reaches the second image processing unit, the first image processing unit transmits the image data with the second IP address after executing the first processing, the second switch unit switches connection between the connectors in accordance with the second IP address so that the image data transmitted from the first image processing unit reaches the second image processing unit, and the second image processing unit executes the second processing on the image data transmitted from the first image processing unit in accordance with the second control signal.

3. The image processing apparatus according to claim 1, wherein the position information is allocated to the connectors in accordance with rack numbers and slot numbers of positions where the connectors are positioned.

4. The image processing apparatus according to claim 1 wherein the image processing units include:
a memory unit configured to store image data; and
a decoding unit configured to decode the image data.

5. The image processing apparatus according to claim 4, wherein the image processing units include an encoding unit configured to encode image.

6. The image processing apparatus according to claim 1, wherein the standard for the transmission line in the IP network includes Ethernet (registered trademark).

7. An image processing unit for an image processing apparatus comprising connectors to each of which position information is allocated, wherein the image processing unit is connected to the image processing apparatus via one of the connectors, the image processing unit comprising:
a reading unit configured to read position information from the connector connected to the image processing unit;
a determining unit configured to determine an IP address of the image processing unit based on the position information read by the reading unit;
a process execution unit configured to execute predetermined processing on image data in accordance with a control signal transmitted from a control unit of the processing apparatus via a first switch unit, wherein a second IP address for a second image processing unit is appended to the control signal; and
a transmission unit configured to transmit the IP address and the identification information of the image processing unit to the control unit, and to transmit the processed image data with the second IP address to a second switch unit so that the image data transmitted from the image processing unit reaches the second image processing unit specified by the second IP address.

8. The image processing unit according to claim 7, wherein the position information is allocated to the connectors in accordance with rack numbers and slot numbers of positions where the connectors are positioned.

9. The image processing unit according to claim 7, wherein the process execution unit stores the image data.

10. The image processing unit according to claim 7, wherein the process execution unit decodes the image data.

11. The image processing unit according to claim 7, wherein the process execution unit encodes the image data.

12. The image processing unit according to claim 7, wherein the standard for the transmission line in the IP network includes Ethernet (registered trademark).

13. An IP address managing method used by the image processing apparatus of claim 1, the method comprising:
reading position information from the connectors by each of the image processing units;
outputting, from each of the image processing units and via each of the connectors, an IP address of the image processing unit determined based on the position information and identification information which denotes a function of the image processing unit via the connector;
receiving the IP addresses and the identification information via the connectors by the control unit;
managing the IP addresses and the identification information of the image processing units by the control unit;
selecting, in response to the instruction signal for processing image data, an image processing unit from the image processing units based on the identification information;
generating, by the control unit, the control signal;
determining the first IP address which denotes the destination of the control signal based on the IP address of the selected image processing unit;
determining the second IP address which denotes the destination of the image data transmitted from the selected image processing unit after processing; and
transmitting the control signal with the first and second IP addresses.

* * * * *